United States Patent [19]
Golibersuch

[11] 3,815,022
[45] June 4, 1974

[54] METHOD AND APPARATUS FOR MEASURING SMALL ASPHERICAL PARTICLES

[75] Inventor: David C. Golibersuch, Schenectady, N.Y.

[73] Assignee: General Electric Company, Schenectady, N.Y.

[22] Filed: Oct. 4, 1972

[21] Appl. No.: 294,921

[52] U.S. Cl. .......................................... 324/71 CP
[51] Int. Cl. ........................................... G01n 27/00
[58] Field of Search ................. 324/71 CP; 356/102; 73/432 PS

[56] References Cited
UNITED STATES PATENTS
3,392,331  7/1968  Coulter ................................ 324/71
3,560,847  2/1971  Boyd et al. .......................... 324/71

FOREIGN PATENTS OR APPLICATIONS
1,231,173  5/1971  Great Britain ....................... 324/71

OTHER PUBLICATIONS
Grover, N. B., Naaman, J., Ben–Sasson, S. and Doljanski, F., (1972) Electrical Sizing of Particles in Suspensions – 3., Biophys. J., 9, 1099–1116.
H. E. Kubitschek, "Electronic Measurement of Particle Size" Research, Vol 13. April 1960, pp. 128–135.
Spielman & Goren, "Improved Resolution in Coulter Counting by Hydrodynamic Focusing" Jour. of Colloid and Interface Science, 26, pp. 175–182 1968.

*Primary Examiner*—Alfred E. Smith
*Assistant Examiner*—Rolf Hille
*Attorney, Agent, or Firm*—Paul I. Edelson; Joseph T. Cohen; Jerome C. Squillaro

[57] ABSTRACT

Method and apparatus for measuring size and asphericity of small aspherical particles is disclosed. Particles to be measured are urged through a long cylindrical pore whose diameter is greater than the largest major dimension of the particles expected and whose length is greater than several times its diameter. The suspending fluid, containing the small particles, in flowing through a long pore, exhibits a generally paraboloidal velocity profile. The variation in fluid velocity as a function of off-axis radial distance within the pore applies a shear moment to particles within the pore causing them to rotate. The resistance across the pore is measured in a conventional manner. In the case of spherical particles, rotation responsive to the fluid shear has no effect upon the resistive pulse output and measurements are performed as in the prior art. In the case of aspherical particles, on the other hand, the rotation caused by the fluid shear causes the observed resistance pulse across the pore to exhibit a plurality of relative maxima and minima. The major axis to minor axis ratio and the volume of the aspherical particles is determined from these relative maxima and minima.

19 Claims, 12 Drawing Figures

METHOD AND APPARATUS FOR MEASURING SMALL ASPHERICAL PARTICLES

BACKGROUND OF THE INVENTION

1. Scope

This invention relates to particle analyzers. More particularly, this invention relates to resistive pulse particle analyzers in which particles to be analyzed are driven in an electrolyte solution through a small pore while the resistance of the electrolyte across the pore is monitored.

2. Cross Reference to Related Copending Applications

This application is related to the copending application of Golibersuch, Ser. No. 81,825, filed Oct. 19, 1970, now U.S. Pat. No. 3,742,348 and the copending application of Bean and DeBlois, Ser. No. 228,719, filed Feb. 23, 1972 as a continuation of Ser. No. 13,115, filed Feb. 20, 1970, now abandoned. These related copending applications are assigned to the assignee of this invention and are incorporated herein by reference thereto.

3. Prior Art

Particle counters known in the art as resistive pulse particle counters operate by urging particles suspended in an electrolyte through a small pore across which an electrical potential is maintained for causing an electrical current to flow therethrough. The resistance across the pore is a function of the resistivity of the electrolyte therein and the cross sectional area and length of the pore. When a particle is present in the pore, a quantity of electrolyte is displaced by the particle. This decreases the volume of electrolyte within the pore and consequently increases the resistance to electrical current flowing through the pore. The change in resistance is electrically detected and, from the detected resistance change, the diameter of the particle in the pore is determined in accordance with the equation $$\Delta R = 4\rho d^3/\pi D^4 \quad (1)$$

where $\Delta R$ is the change in resistance through the pore, $\rho$ is the resistivity of the electrolyte, $d$ is the diameter of the particle, and $D$ is the diameter of the pore. In prior art devices, the diameter of spherical particles is thus determined. Additionally, prior art devices have determined from the width of the resistive pulse produced by a particle traversing the pore, the transit time of the particle through the pore; when, for example, the particles are urged through the pore by an electric field of known magnitude, the determination of the width of the resistive pulse is useful for determining the electrophoretic mobility of the particles.

In the case of spherical particles, equation (1) is equivalent to:

$$\Delta R = 3/2\, R\, v/V \quad (1a)$$

where $R$ is the resistance across the pore in the absence of a particle therein, $v$ is the volume of the particle in the pore, and $V$ is the effective electrical volume of the pore. The constant 3/2 in equation (1a) is characteristic of spherical particles and corresponds to the value of the shape factor $f$ in the case of spheres. The shape factor $f$ is a geometrical factor which is a function of particle shape and orientation. Since spherical particles are symmetrical about a point, their geometry is constant with rotational orientation and the shape factor $f$ is a constant. In the case of an aspherical particle, on the other hand, the shape factor $f$ is a function of the rotational orientation of the particle and so is not a constant. Accordingly, the amplitude of a resistive pulse produced by the passage of an aspherical particle through the pore is variable with the orientation of the particle and so is not accurately indicative of the size of the particle.

Many particles are not spherical. In the case of many of these, it is desirable to be able to determine the degree of asphericity as well as the volume of the particles; that is to say, that for particles which are, for example, ellipsoids of revolution, it is desirable to be able to determine the major axis to minor axis ratio of the particle. For example, red blood cells are substantially disk-like particles and a spherical red blood cell is a pathological cell.

BRIEF DESCRIPTION OF THE INVENTION

It is accordingly an object of this invention to provide method and apparatus for measuring small aspherical particles.

It is another object of this invention to provide such method and apparatus which will distinguish between spherical and aspherical particles and provide an indication of the major axis to minor axis ratio for such aspherical particles.

Briefly, and in accordance with one embodiment of this invention, small particles suspended in an electrolyte are urged through a long pore whose length is several times its diameter. The pore is sufficiently long that a generally parabolic fluid velocity profile is maintained in the electrolyte flowing therethrough. The parabolic fluid velocity profile exerts an over-turning moment on aspherical particles within the pore causing them to tumble as they traverse the pore. The pore is also sufficiently long that the particles complete more than one half revolution and preferably at least one full revolution in traversing the pore. An electric current is passed through the electrolyte in the pore and the electrical resistance across the pore is monitored. The electrical resistance across the pore is at an absolute maximum value when the major axis of an aspherical particle in the pore is perpendicular to the direction of electrolyte flow through the pore and the resistance across the pore is an absolute minimum when the major axis of the particle is parallel to the direction of electrolyte flow through the pore. A plurality of resistance maxima and minima are accordingly observed and the major axis to minor axis ratio of the aspherical particle is determined from either the amplitudes or the time relation between successive maxima and minima. Additionally, the volume of the particle is determined from the envelope curves of the maxima or minima.

The novel features of this invention sought to be patented are set forth with particularity in the appended claims. The invention, together with further objects and advantages thereof, may be understood from a reading of the following specification and appended claims in view of the accompanying drawings.

BRIEF DESCRIPTION OF THE DRAWINGS

FIG. 3 illustrates the measurement waveforms obtained in the practice of this invention.

DETAILED DESCRIPTION OF THE INVENTION

Figure 1:
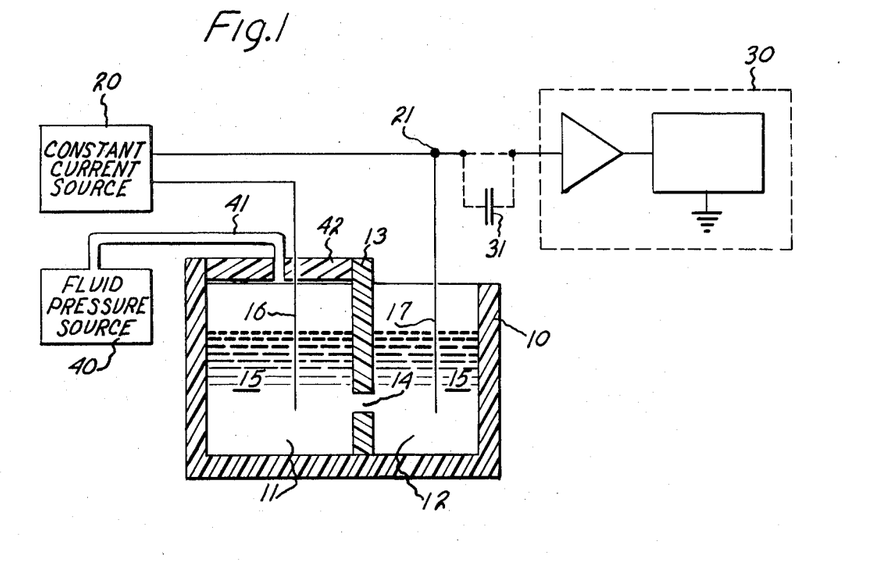
FIG. 1 is a schematic diagram of preferred apparatus for practicing this invention.
Figure 5:
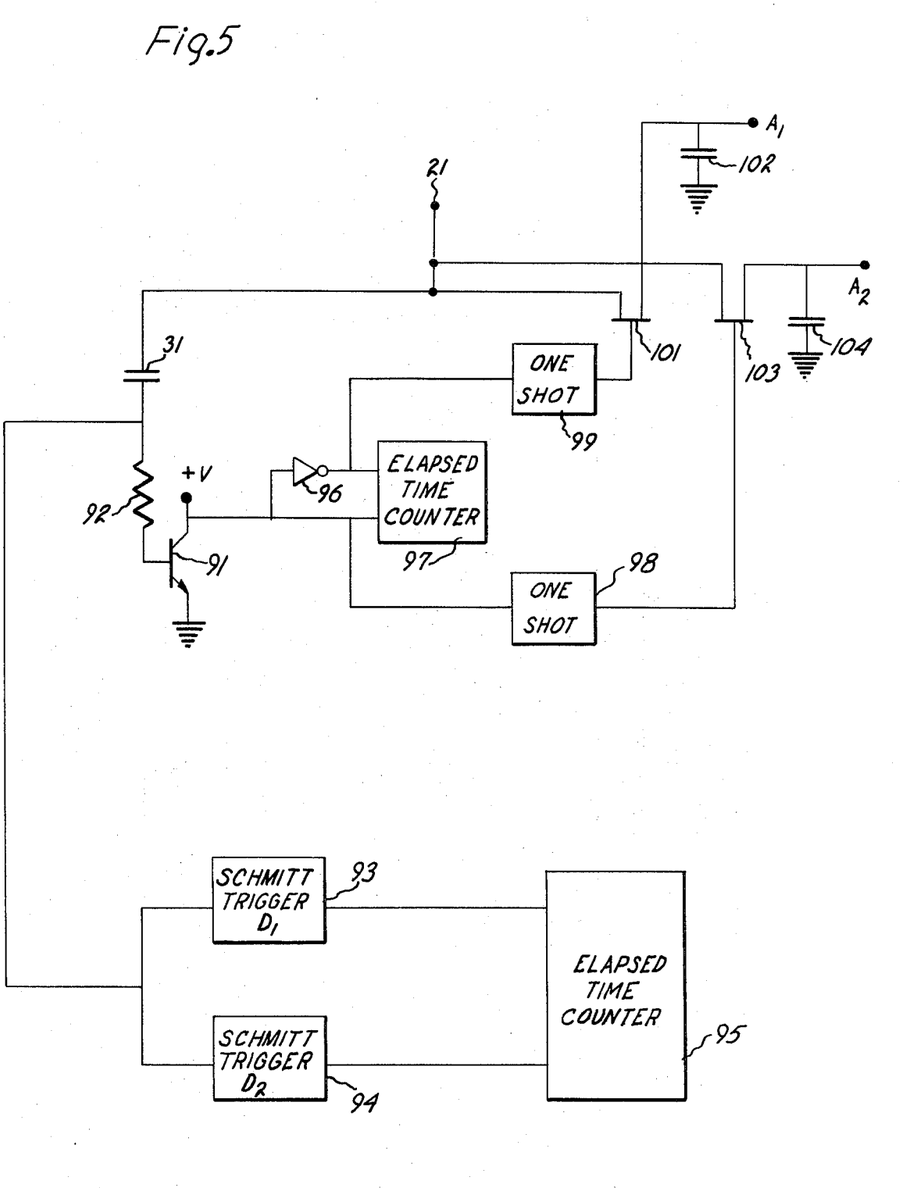
FIG. 5 is an electrical diagram, partially in block form and partially in schematic form, of circuitry useful in analyzing resistance pulses produced by aspherical particles in accordance with this invention.

FIG. 1 illustrates apparatus for practicing this invention comprising a container 10 which is separated into two volumes 11 and 12 by partition member 13 having therein a pore 14. Partition member 13 is fabricated from a fluid impervious, electrically insulating, material which is further adapted to having pore 14 produced therein by mechanical or chemical means; for example, partition member 13 may be of glass, mica, or plastic, and pore 14 may, for example, be formed by chemical etching of radiation damage tracks produced in member 13. Volumes 11 and 12 contain a quantity of electrolyte 15 therein and electrodes 16 and 17 depend into electrolyte 15 in volumes 11 and 12, respectively. Electrodes 16 and 17 are connected to a constant current source 20 so that an electrical current flows between electrodes 16 and 17 in electrolyte 15 through pore 14. The electrical resistance between electrodes 16 and 17 is determined by the resistivity of electrolyte 15 and the dimensions of pore 14 in accordance with the equation $$R = 4\rho(L + 0.8D)/\pi D^2 \quad (2)$$

where $\rho$ is the resistivity of electrolyte 15, L is the length of the pore, and D is the diameter of the pore. Since source 20 is a constant current source, the electrical potential appearing at point 21 is a function of the electrical resistance through pore 14 in accordance with Ohm's Law. Point 21 is connected to voltage responsive measurement and display means 30 which provides an indication of the electrical potential at point 21 and consequently an indication of the electrical resistance between electrodes 16 and 17. Measurement and display means 30 may, for example, comprise an oscilloscope, having a high input impedance, a high impedance pre-amplifier and oscillographic chart recorder, or the circuitry discussed hereinafter with reference to FIG. 5.

In one embodiment of this invention, particles to be measured are introduced into and suspended in that quantity of electrolyte 15 contained in volume 11. Electrolyte 15 and the particles suspended therein are urged through pore 14 from volume 11 to volume 12 preferably by hydrostatic pressure. Hydrostatic pressure may be provided by filling volume 11 to a greater height than volume 12 with electrolyte 15, but for one of the measurement procedures available in accordance with this invention, the resulting variability of the driving hydrostatic pressure at pore 14 is undesirable. Accordingly, a constant hydrostatic pressure difference between volumes 11 and 12 is desirable, and may be provided, for example, by fluid pressure source 40 which may, for example, be a constant pressure compressed air reservoir which is connected through conduit 41 and seal member 40 to volume 11.

Figure 2:
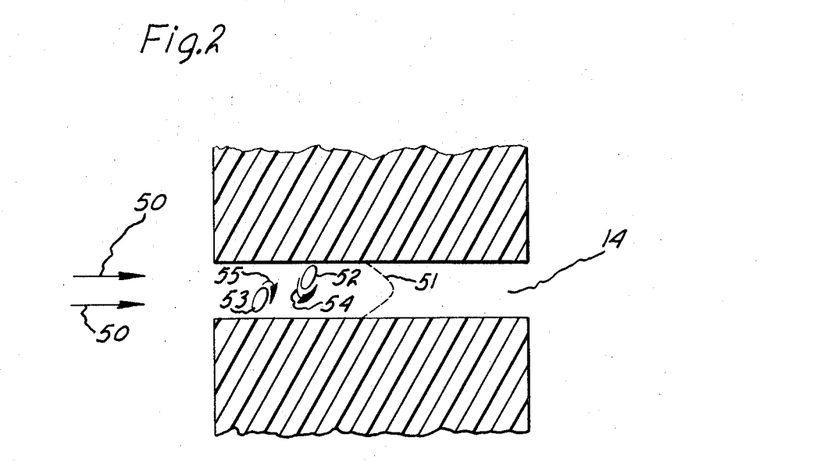
FIG. 2 is an enlarged cross-sectional view of a measurement pore in accordance with this invention.

FIG. 2 is a magnified view of pore 14 whereby the principle of operation of this invention is illustrated. Hydrostatic pressure, for example, causes fluid to flow into and through pore 14 in the direction illustrated by arrows 50. Pore 14 is a long pore whose length is on the order of ten times its diameter. Fluid flow therein has the characteristics of laminar flow through a pipe and so exhibits a generally parabolic fluid velocity profile as indicated at 51 in the pore. The variation of fluid velocity through the pore with radial distance in the pore produces an overturning moment on particles within the pore such as 52 and 53 causing them to tumble in traversing the pore. Particle 52, being disposed on a first side of the axis of pore 14 tumbles in a first direction indicated by arrow 54, while particle 53 being on the opposite side of the axis of pore 14, tumbles in the opposite direction as indicated by the arrow 55.

The resistance to an electrical current flowing between electrodes 16 and 17 through pore 14 is modified by the presence therein of a particle. The change in resistance is detected as a voltage change at point 21. In the general case, the resistance change resulting from the presence of an insulating particle in a pore is given by the equation $$\Delta R/R = f\,v/V \quad (3)$$

where $v$ is the particle volume, V is the effective electrical volume of the pore, i.e., $V = \alpha/4\, D^2(L + 0.8D)$, and $f$ is a geometrical factor dependent upon the shape and orientation of the particle. As discussed hereinbefore, in the use of prior art particle counters, the factor $f$ is taken to be a constant and this assumption is correct only in the case of spherical particles.

A spherical particle may be characterized by the pulse output obtained from its passage through a short pore. An aspherical particle, on the other hand, cannot be so characterized because firstly, a short pore may not provide the generally parabolic fluid velocity profile needed to apply an overturning moment to the aspherical particles in the pore, and secondly, even if tumbling were to be provided in a short pore, the length of pore must be sufficient for the particle to undergo at least one half tumbling revolution within the pore so that all significant orientations are confidently known to have been observed. From equation (3) above, it is apparent that as a particle tumbles through pore 14 it causes variations in the factor, f, and consequently causes periodic resistance variations and corresponding periodic variations in the electrical potential observable at point 21.

The fluid velocity differential over the surface of any particle of finite size imparts a rotational motion to the particle. In the case of spherical particles, this rotational motion results in no observable variations in the resistance pulse output across the pore, because of the symmetry of spherical particles about a point. In the case of aspherical particles rotational motion results in resistance variations observed across the pore. In the case of a generalized aspherical particle, the locus of any given point on the particle is a very complex path and has not been well described to date. It is, however, known that such locii describe periodic orbits, and, for the case of particles well described as ellipsoids of revolution, that twice in each period the particle assumes an orientation in which its axis of revolution is perpendicular to the fluid flow.

Figure 3A:
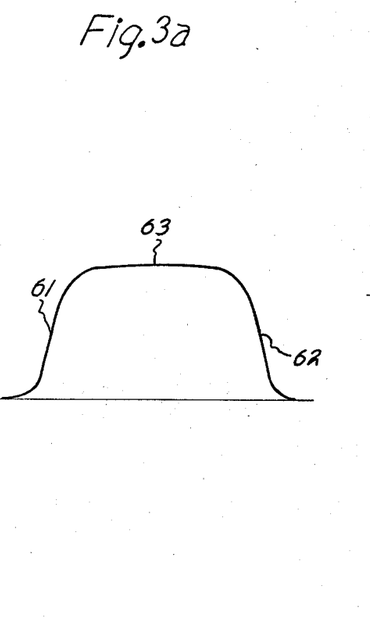
FIG. 3a illustrates the waveform obtained from a spherical particle traversing the pore.

FIG. 3 illustrates the waveform obtained from spherical and aspherical particles traversing the long pore of this invention. FIG. 3a is the signal waveform produced by a spherical particle traversing the long pore 14. The pulse shown in FIG. 3a has leading edge 61 and a trailing edge 62 whose slopes are respectively characteristic of the entry of the particle into the pore and the exit of the particle from the pore. During the time that the spherical particle is wholly within the pore, the pulse amplitude is essentially constant as shown at 63. From the observation of constant amplitude at 63, the determination is made that the particle is spherical; accordingly, the value of the factor f is equation (3) corresponding to a spherical particle is employed and the diameter or volume of the particle is determined from the maximum amplitude of the pulse as in the prior art. It should be remembered that while the measurement of spherical particles in accordance with this invention is performed in the same manner as in the prior art, a significant feature of this invention is that it enables one to determine that a given spherical particle is indeed spherical, in contrast to the prior art techniques in which all particles were assumed to be spherical because of the inability of prior art techniques and devices to differentiate among shapes.

Figure 3B:
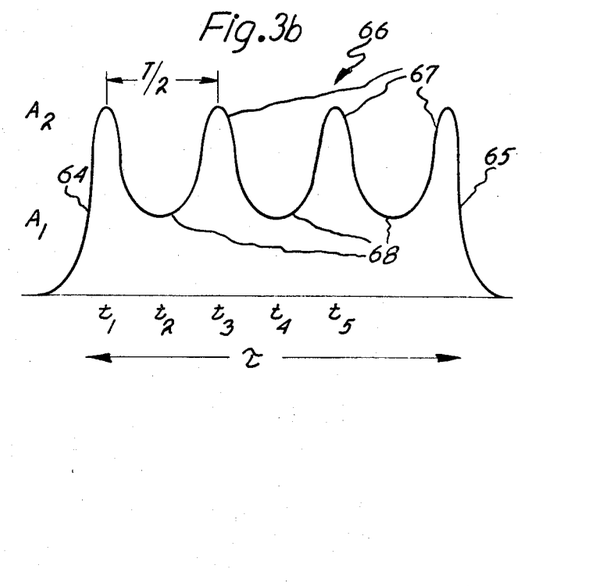
FIG. 3b illustrates the waveform obtained from a typical aspherical particle traversing the pore.

FIG. 3b illustrates a typical pulse produced by the passage of an aspherical particle through pore 14. The pulse illustrated in FIG. 3b has leading and trailing slopes 64 and 65 which correspond respectively to the entry of the particle into the pore and the exit of the particle from the pore. When the particle is wholly within the pore and traversing therethrough, the waveform indicated generally at 66 is observed. As the particle tumbles through the pore in response to the overturning moment provided by the generally parabolic fluid velocity profile, a plurality of relative maxima 67 and a plurality of relative minima 68 are observed.

Maxima 67 occur when the particle orientation is such that the current carrying electrolyte cross section in the pore is a minimum area, and minima 68 occur when the particle orientation allows the largest cross-sectional area of current carrying electrolyte in the pore. Because of the complexity of particle orbits referred to above, the resistance pulse of FIG. 3 provides only relative information in the general case. However, because in the case of ellipsoids of revolution, it is known that twice in each period the axis of revolution is perpendicular to the fluid flow, information about the size and shape of these particles may be extracted from the waveform of FIG. 3b.

The envelope of minima 68 is a constant amplitude defining a first amplitude level A1 and the envelope of maxima 67 is a constant amplitude defining a second amplitude level A2. The amplitude of the envelope of relative minima A1 indicates the volume of oblate particles. The amplitude of the envelope of relative maxima A2 indicates the volume of prolate particles. Since it is known that the particle axis of revolution must be perpendicular to the fluid flow at some time during the passage of the particles through the pore, it is clear that for the case of an oblate ellipsoid, such as for example a red blood cell, the minimum pulse amplitude observed, A1, in the passage of any such particle will be the absolute minimum observable in the passage of any size population of identical particles. Similarly, the passage of each prolate ellipsoid, such as for example a tubercle baccilus, results in the obseravtion of the maximum level, A2, which cannot be exceeded in the passage of any size population of identical particles. On the other hand, the maxima 67 observed for any passage of an oblate ellipsoid, or the minima 68 observed for any passage of a prolate ellipsoid is a function of the initial orientation of the particle in the pore and so is not related to the corresponding relative maxima or minima produced by the passage of another identical particle through the pore. In accordance with this invention, particle shape, that is to say, the ratio between the major and minor axes of a particle, is determined from either a comparison between the relative extreme amplitudes A1 and A2 or from a determination of the time between successive relative maxima or successive relative minima.

Amplitude comparisons cannot yield the axis ratio for a single particle or for a population characterized by varying axis ratios because one of the resistance pulse extremal amplitudes is a function of the initial orientation of the particle. An amplitude comparison will yield the axis ratio only when it is known that the axis ratio is uniform throughout a particle population and that the population is sufficiently large that it can confidently be assumed that all initial orientations have been observed. In this particular case the axis ratio is equal to the ratio of the maximum amplitude to the minimum amplitude observed from the passage of the entire population through the pore.

The axis ratio of the particles of a homogeneous population may be determined by a comparison of the amplitudes of the relative maxima and relative minima as discussed above. The axis ratio of an individual particle may also be determined, in accordance with another embodiment of this invention, from the time between successive relative maxima or successive relative minima. In this case, since a single particle can be analyzed individually, there is no need for a homogeneous population.

It has already been noted that fluid flowing in the long pore has a generally parabolic fluid velocity profile; mathematically, this fluid velocity profile is expressed by $$v(r) = v_0[1 - (r/R)^2]$$

(4)

where $r$ is the radial distance from the axis of the pore, $R$ is the radius of the pore, $v_0$ is the fluid velocity along the pore axis, and $v(r)$ is the fluid velocity at the radial distance r from the pore axis. Along the axis of the pore, where $r = 0$, the fluid velocity $v_o$, is at its maximum value and is given by $$v_o = R^2P/4\eta L \tag{5}$$

where P is the applied pressure across pore 14, $\eta$ is the viscosity of electrolyte 15, and L is the length of pore 14. The pulse width $\tau$ illustrated in FIG. 3b corresponds to the transit time of a particle through pore 14 and is given by $$\tau = L/v_o [1 - (r/R)^2]^{-1} \tag{6}$$

Aspherical particles are caused to tumble in traversing pore 14 by a fluid shear, $G(r)$ resulting from generally parabolic fluid velocity profile within the pore whose magnitude is obtained by differentiating equation (4) with respect to the radial distance. The magnitude of the shear is therefore given by $$G(r) = 2v_o r/R^2 \tag{7}$$

The shear causes aspherical particles to rotate with a period T which is given by $$T = 2\pi/G \cdot 1 + \gamma^2/\gamma \tag{8}$$

where $\gamma$ is the axis ratio of the aspherical particle. In a complete rotation a particle axis of revolution is at two times perpendicular to the pore axis. In FIG. 3b, the time between successive relative maxima 67 and the time between successive relative minima 68 are equal to each other and to the quantity T/2. From equations (6), (7), and (8), equations $$\tau/T = L \gamma (r/R)/\pi R(1 + \gamma^2)[1 + (r/R)^2] \tag{9}$$

and $$1/T^2 = (V_o/\pi R)^2 (\gamma/1 + \gamma^2)^2 (1 - L/\tau V_o) \tag{10}$$

which may be solved for the particle axis ratio, $\gamma$ are obtained. Equation (9) requires that the radial position of the particle in the pore be known, but is independent of the pressure across pore 14. Equation (10) is independent of the position of the particle in the pore, but the pressure across the pore must be known in order to supply the quantity $V_o$ in accordance with equation (5) so that equation (10) may be solved from $\gamma$. Thus, the axis ratio of a particle is determined from the time relationships between the elements of the resistive pulse produced by the passage of the particle through pore 14; volume of the particle is determined from the resistive pulse amplitude as previously discussed.

Figure 3C:
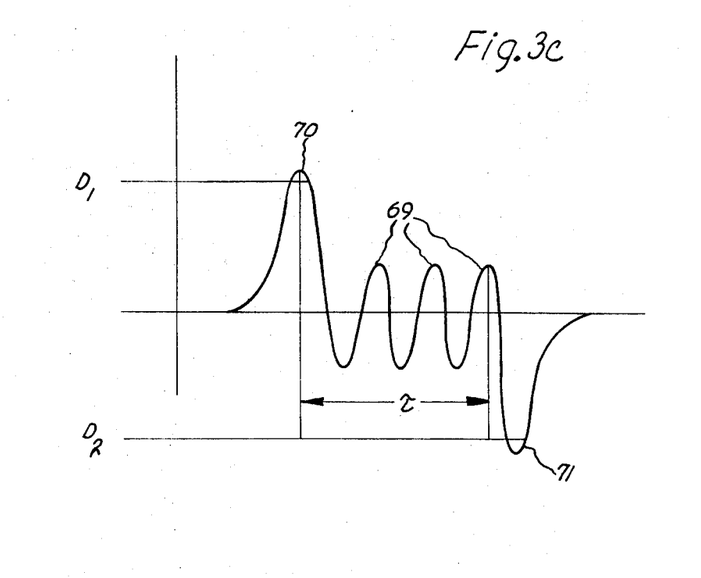
FIG. 3c illustrates the first derivative with respect to time of the waveform of FIG. 3b.

In accordance with the teachings above, a convenient method for analyzing the volume and shape of particles involves differentiating the resistive pulse produced by the passage of the particles through the pore as shown, for example, in FIG. 3b, by, for example, inserting a small capacitor 31 in series between point 21 and measurement and display means 30 in the circuit of FIG. 1. FIG. 3c represents the first derivative with respect to time of the pulse of FIG. 3b. Each relative maximum and each relative minimum of FIG. 3b corresponds to a zero crossing 69 of FIG. 3c. The pulse width $\tau$ of the pulse of FIG. 3b is equal to the time between the occurrence of the largest positive value 70 and the largest negative value 71 in the derivative pulse of FIG. 3c. $\tau$ is accordingly determined by the time elapsing between the gating of the appropriate threshold detecting circuit such as Schmitt triggers by pulses exceeding the levels of D1 and D2, respectively, as shown in FIG. 3c. The quantity T/2 is determined by counting the time elapsing between successive zero crossings 69 as shown in FIG. 3c. The amplitude measurements relevant to the determination of particle volume is made by gating a sample and hold circuit upon the occurrence of zero crossings 69.

FIG. 5 is an electrical diagram, partially in block form and partially in schematic form, of circuitry useful in analyzing resistance pulses produced by aspherical particles in accordance with this invention. Point 21 and capacitor 31 in FIG. 5 correspond to the similarly numbered elements shown in FIG. 1. The electrical potential across the pore observed at point 21 is differentiated by capacitor 31 and the differentiated signal is delivered to the base of transistor 91 through resistor 92 and to Schmitt triggers 93 and 94. Schmitt trigger 93 provides an output pulse during the time in which it input voltage level exceeds the level D1 shown in FIG. 3c corresponding to the entry of a particle into the pore. Schmitt trigger 94 provides an output pulse when its input level exceeds, in absolute value, the level shown as D2 in FIG. 3c corresponding to the exit of a particle from the pore. The outputs of Schmitt triggers 93 and 94 are connected to elapsed time counter 95 which measures the elapsed time between output pulses from Schmitt trigger 93 and Schmitt trigger 94. The time recorded by elapsed time counter 95 is therefore equal to the pulse width $\tau$ of the pulse produced by a particle traversing the pore. Elapsed time counter 95 may be any convenient counting circuit as is known in the art and may for example by a Hewitt Packard Type 5245 electronic counter, or alternatively may be constructed from an astable multivibrator which is turned on by an output pulse from Schmitt trigger 93 and is turned off by an output pulse from Schmitt trigger 94. The output of such a stable multivibrator circuit is connected to a counting circuit such as for example a ring counter.

The zero crossings 69 as shown in FIG. 3c, which correspond to relative maxima and minima 67 and 68 of FIG. 3b are detected by transistor 91 which turns on at the zero crossings of positive going slopes in FIG. 3c and turns off at the zero crossings of negative going slopes in FIG. 3c. The function of resistor 92 is to insure that transistor 91 changes from conducting to nonconducting condition precisely at the zero crossing of the input signal by compensating for the base emitter diode voltage of transistor 91. The output of transistor 91 is delivered to an inverter circuit 96, a first input of elapsed time counter 97, and to a one-shot circuit 98. Therefore, at the first zero crossing of the waveform of FIG. 3c, corresponding to the first maximum 67 of the waveform of the FIG. 3b, elapsed time counter 97, which may be similar to counter 95, described above, begins to count. Simultaneously, one-shot 98 produces an output pulse which triggers a sample and hold circuit comprising transistor 103 and capacitor 104 which samples the potential A2 present at point 21 and holds it for readout. At the next zero crossing of the waveform of FIG. 3c, transistor 91 ceases to conduct and accordingly inverter 96 provides an output. The output of inverter 96 is delivered to a second input of elapsed time counter 97 to terminate the counting process begun at the first zero crossing of the waveform of FIG. 3c and delivers an output to one-shot circuit 99 which generates a pulse to trigger a second sample and hold circuit comprising transistor 101 and capacitor 102, which serves to sample the A1 potential present at point 21 and hold it for readout.

As an alternative to the use of the analytical apparatus of FIG. 5, the potential observed at point 21 may be digitized by an A to D converter and the parameters of interest described above may be extracted from the digitized potential signal by a digital computer under the control of an appropriate program.

Figure 4:
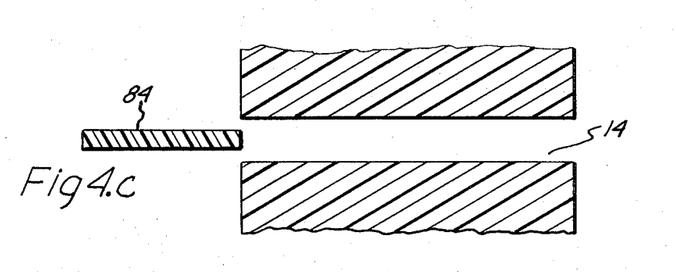
FIGS. 4a through 4d illustrate a measurement pore in accordance with this invention including additional means for insuring that particles within the pore will be subjected to an overturning moment.
Figure 4A:
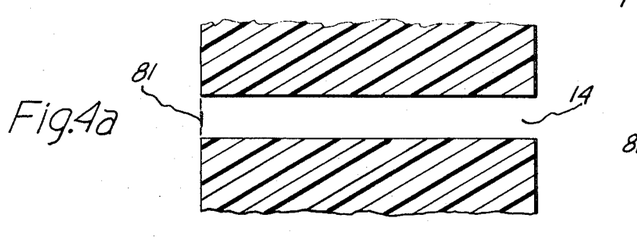
Figure 4B:
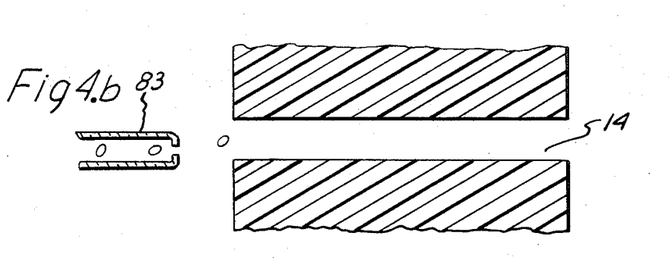
Figure 4D:
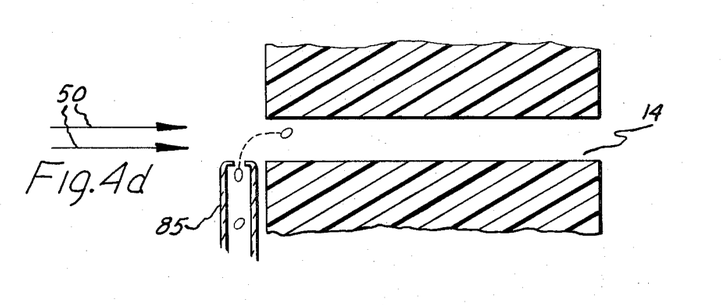

As has already been noted, and as is obvious to one skilled in the art from equations (4) and (7) above, a particle entering pore 14 on the axis of the pore will not be subjected to any overturning moment and will not tumble through the pore. Accordingly, it is desirable to prevent particles from entering the pore on the axis. FIG. 4 illustrates means in accordance with this invention for preventing particles from traversing the pore along the axis. In the embodiment of FIG. 4a, an obstruction 81 which is preferably formed of a membranous material to reduce the restriction provided to flow of electrolyte 15 through pore 14 is positioned at the entrance aperture of pore 14 along the axis thereof to prevent particles from entering pore 14 on the axis. Obstruction 81 is supported in position in the entry aperture of pore 14 by filaments 82 which are preferably of the same material as obstruction 81. FIG. 4b illustrates a second means for insuring that particles traverse pore 14 off the axis of pore 14, comprising an injector nozzle 83 through which particles are injected into the pore at a known radial distance from the axis of the pore. Because this embodiment not only prevents particles from entering the pore on the axis, but also enables the radial distance of the particles in pore 14 to be accurately determined, the FIG. 4b embodiment is the preferred embodiment when γ is to be determined by evaluation of equation (9). FIG. 4c illustrates an embodiment which is essentially a variation of the FIG. 4a embodiment in which a cylindrical obstruction 84 is positioned coaxially with pore 14 at the entry aperture thereof. Cylindrical obstruction 84 may be supported by attachment to a wall of chamber 10 by adhesive means not shown. The embodiment of FIG. 4d is essentially a modification of the FIG. 4b embodiment in which particle injecting nozzle 85 is positioned to inject particles into pore 14 transversely to the free fluid flow of electrolyte 15 through pore 14 as represented by arrows 50. The injection of particles from nozzle 85 to pore 14 off the axis of pore 14 is insured by selection of an appropriate ratio between the injection fluid pressure in nozzle 85 and the free fluid flow pressure urging the electrolyte through the pore as illustrated by arrows 50.

Figure 6:
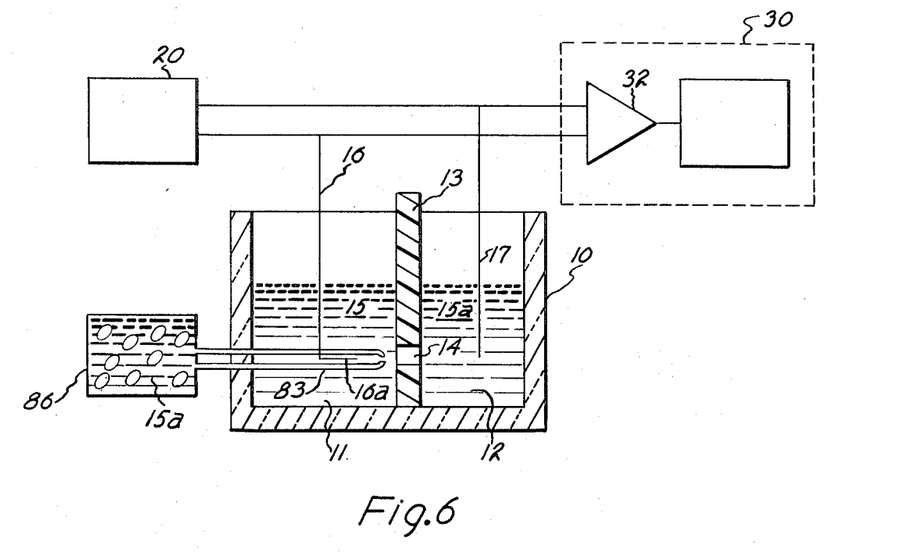
FIG. 6 illustrates a modification of the embodiment of FIG. 1 in combination with a modification of the embodiment of FIG. 4b which provides for greatly increased measurement system sensitivity.

FIG. 6 illustrates a modification of the embodiment of FIG. 1 in combination with a modification of the embodiment of FIG. 4b which provides for greatly increased measurement system sensitivity. In the modification of FIG. 6, electrolyte 15 preferably has a very low conductivity and the particles to be analyzed are contained in container 86 suspended in electrolyte 15a which has a high conductivity. Electrolyte 15a in container 86 is under a hydrostatic pressure which urges it and the particles suspended therein through nozzle 83 which directs a stream of electrolyte 15a and the particles contained therein through pore 14 at a known radial distance from the axis thereof. Electrode 16 penetrates nozzle member 83 and has a portion 16a thereof coaxially disposed within nozzle member 83. This modification results in an increase in amplitude of the electrical signal obtained from a given particle by decreasing the effective electrical volume of pore 14. Because nozzle 83 directs particles into pore 14 at a known fixed position, the pressure at which particles are urged through pore 14 need not be known and the particles may be analyzed by evaluating equation (9).

In accordance with another feature of this embodiment, sensitivity is further increased by including in measurement and display means 30 a differential amplifier 32 having two input terminals connected respectively to electrodes 16 and 17. The use of differential amplifier 32 results in the cancellation of noise which may be present in the measurement system.

While this invention has been described with reference to particular embodiments and examples, other modifications and variations will occur to those skilled in the art, in view of the above teachings. Accordingly, it should be understood that within the scope of the appended claims the invention may be practiced otherwise than is specifically described.

The invention claimed is:

1. In apparatus for analyzing small particles, said apparatus having:
   fluid containment means;
   a partition for separating said fluid containment means into first and second chambers;
   a pore in said partition extending therethrough to allow movement of fluid and particles between said first and second chambers;
   means for causing an electrical current to flow through said pore; and
   means for detecting the resistance to the flow of said electrical current;
   the improvement which comprises:
   means for causing laminar fluid flow from said first chamber to said second chamber through said pore to transport said particles through said pore and to impart a rotational motion to said particles when said particles are within said pore resulting in a variation of said resistance during the passage of aspherical particles; and
   means for analyzing said variations of said resistance to determine the shape and volume of said particles.

2. The improvement of claim 1 wherein said variations are periodic in time and said means for analyzing includes means for determining the period of said variations to determine the shape of said particles.

3. The improvement of claim 1 wherein said means for analyzing includes means for determining relative maxima and minima of said resistance to determine the volume of said particles.

4. The improvement as claimed in claim 1 wherein said pore is a long pore whose length is equal to at least five times the major dimension of the entry aperture of the pore.

5. The improvement as claimed in claim 4 wherein said pore is a generally right circular cylindrical pore whose length is equal to between five and ten times its diameter.

6. The improvement as claimed in claim 4 wherein said source of electrical potential is a constant current source connected between first and second electrodes depending respectively into said first and second chambers.

7. The improvement as claimed in claim 6 wherein said means for detecting the resistance is a voltage responsive circuit connected between one said electrode and ground.

8. The improvement as claimed in claim 6 wherein said means for detecting the resistance includes a differential amplifier circuit having first and second input means connected respectively to said first and second electrodes.

9. The improvement as claimed in claim 1 including additionally means for preventing particles from entering and traversing said pore along the axis thereof.

10. The improvement of claim 9 wherein said means for preventing is an obstruction positioned generally coaxially with said pore and having a portion thereof in the plane of the entry aperture of the pore.

11. The improvement of claim 9 wherein said means for preventing includes a nozzle through which said particles are injected into said pore at preselected radial distance from the axis of said pore.

12. The improvement as claimed in claim 1 wherein said variations of said resistance in time are given by the relationship:

$$1/T^2 = (V_o/\pi R)^2 (\gamma/1 + \gamma^2)^2 (1 - L/\tau V_o)$$

where
L is the length of said pore
$\gamma$ is the axis ratio of said particles,
T is the period of said variations,
R is the radius of said pore,
r is the radial distance of said particle from the axis of said pore,
$V_o$ is the axial fluid velocity in said pore, and
$\tau$ is the transit time of said particle through said pore.

13. The improvement of claim 1 wherein said variations of said resistance in time are given by the relationship:

$$\tau/T = L\gamma \ (r/R)/\pi R(1 + \gamma^2) \ [1 + (r/R)^2]$$

where:
L is the length of said pore,
$\gamma$ is the axis ratio of said particles,
T is the period of said variations,
R is the radius of said pore,
r is the radial distance of said particle from the axis of said pore, and
$\tau$ is the transit time of said particle through said pore.

14. The improvement of claim 12 wherein said means for analyzing includes a two-axis indicating device having first and second input means for receiving signals to be indicated on the axes thereof; said first input means being connected to said means for detecting the resistance and said second input means being connected to a time base generator.

15. The improvement of claim 12 wherein said means for detecting the resistance provides a voltage signal proportional to the resistance and further including:
means connected to said means for detecting the resistance for differentiating said voltage signal; and said means for analyzing the variations includes voltage zero responsive means and first and second voltage level threshold responsive means for receiving and responding to an output of said means for differentiating;
said first and second threshold responsive means being connected to and respectively initiating and terminating the operation of an elapsed time counter to determine the value of the quantity $\tau$;
said voltage zero responsive means providing inverted and non-inverted outputs being connected to and respectively initiating and terminating the operation of a second elapsed time counter to determine the value of the quantity T.

16. A method for analyzing small non-spherical particles comprising the steps of:
suspending said particles in an electrolyte solution in a first chamber, said first chamber being separated from a second chamber containing electrolyte solution by a partition having a pore therein;
applying a positive hydrostatic pressure differential between the electrolyte in said first chamber and the electrolyte in said second chamber, the magnitude of said differential being preselected to cause a laminar flow of electrolyte through said pore and to cause particles to rotate in traversing said pore;

applying an electrical potential across the electrolyte in said pore to cause an electrical current to flow therethrough; the resistance of said electrolyte in said pore responsive to the presence of a particle in said pore providing a current pulse whose internal structure is a function of the shape and volume of said particle;
measuring and analyzing said internal structure to determine the shape and volume of said particles.

17. The method of claim 16 further including the step of: preventing said particles from traversing said pore along the axis thereof.

18. The method of claim 16 wherein said resistance varies when a non-spherical particle traverses said pore and does not vary when a spherical particle traverses said pore and said measuring and analyzing step includes the steps of:
determining the presence or absence of variations of said resistance to determine the shape of said particles; and
measuring the magnitude of said resistance to determine the volume of said particles.

19. The method of claim 18 wherein said variations occurring in the case of non-spherical particles are periodic variations and said measuring and analyzing step further includes the step of:
measuring the period of said variations to determine the shape of said particles.

* * * * *